(12) United States Patent
Cates

(10) Patent No.: US 9,278,704 B2
(45) Date of Patent: Mar. 8, 2016

(54) WHEELED SYSTEM FOR COOLERS

(71) Applicant: John David Cates, Austin, TX (US)

(72) Inventor: John David Cates, Austin, TX (US)

( * ) Notice: Subject to any disclaimer, the term of this patent is extended or adjusted under 35 U.S.C. 154(b) by 0 days.

(21) Appl. No.: 14/523,344

(22) Filed: Oct. 24, 2014

(65) Prior Publication Data

US 2015/0115555 A1     Apr. 30, 2015

Related U.S. Application Data

(60) Provisional application No. 61/895,042, filed on Oct. 24, 2013.

(51) Int. Cl.
| B62B 1/00 | (2006.01) |
| B62B 5/00 | (2006.01) |
| B62B 5/06 | (2006.01) |
| B62B 1/22 | (2006.01) |

(52) U.S. Cl.
CPC ............... *B62B 5/0089* (2013.01); *B62B 1/22* (2013.01); *B62B 5/067* (2013.01); *Y10T 29/49622* (2015.01)

(58) Field of Classification Search
CPC ................................. B62B 5/0089; B62B 1/22
USPC ............ 280/47.26, 655, 30, 79.3, 651, 35, 37
See application file for complete search history.

(56) References Cited

U.S. PATENT DOCUMENTS

| 2,696,990 | A | * | 12/1954 | Davis | 280/47.131 |
| 5,169,164 | A | * | 12/1992 | Bradford | 280/35 |
| 5,249,438 | A | * | 10/1993 | Rhaney | A45C 5/14 280/37 |
| 5,259,215 | A | * | 11/1993 | Rocca | 280/47.26 |
| 5,373,708 | A | * | 12/1994 | Dumoulin, Jr. | A45C 5/146 280/30 |
| 6,142,492 | A | * | 11/2000 | DeLucia | 280/47.331 |
| 6,193,033 | B1 | * | 2/2001 | Sadow | A45C 5/14 280/37 |
| 6,502,656 | B2 | * | 1/2003 | Weiss | A45C 5/14 280/30 |
| 6,755,428 | B2 | * | 6/2004 | Butler | A45C 9/00 280/47.26 |
| 7,111,851 | B2 | * | 9/2006 | Duncan | 280/47.26 |
| 7,744,101 | B2 | * | 6/2010 | Robbins et al. | 280/47.26 |
| 8,720,656 | B2 | * | 5/2014 | Ready | 190/18 A |
| 2006/0138736 | A1 | * | 6/2006 | Clarebrough et al. | 280/47.26 |
| 2007/0068757 | A1 | * | 3/2007 | Tan | 280/47.26 |
| 2013/0168933 | A1 | * | 7/2013 | Watzke | 280/47.26 |

* cited by examiner

*Primary Examiner* — Hau Phan
(74) *Attorney, Agent, or Firm* — Kirk Dorius; Reed & Scardino LLP

(57) ABSTRACT

A wheeled system for coolers including a wheel support and a handle support securable to a cooler using handle grips and tie-down anchor points defined on the cooler body. The wheeled system can include a telescoping handle, brake, lock, and connector tightener.

19 Claims, 13 Drawing Sheets

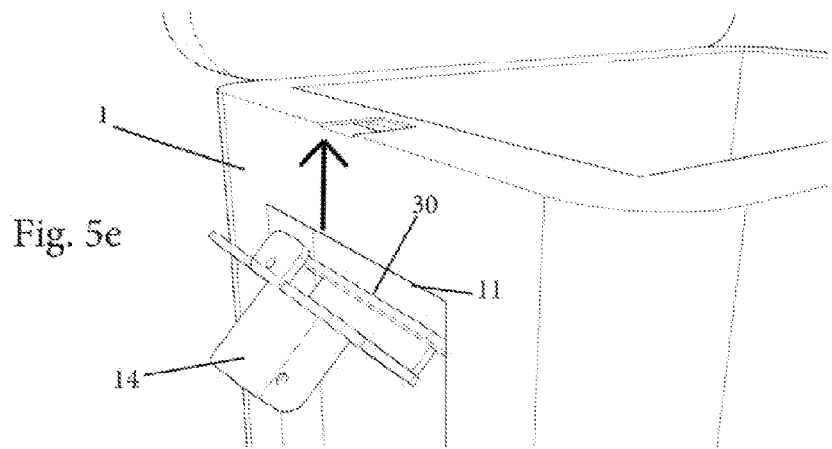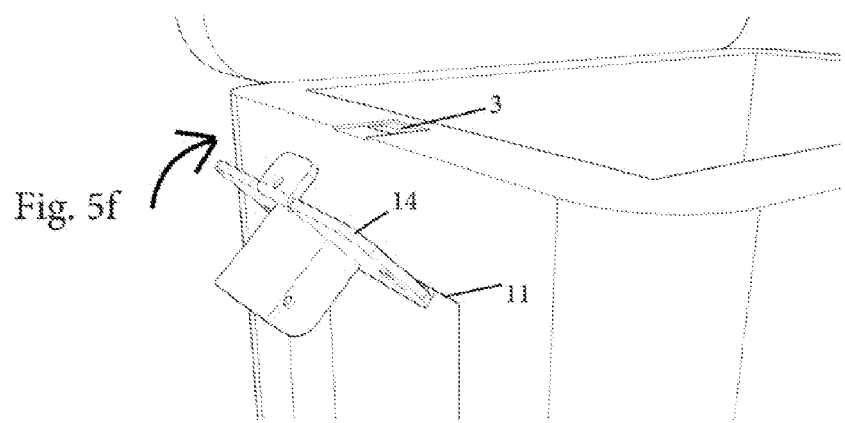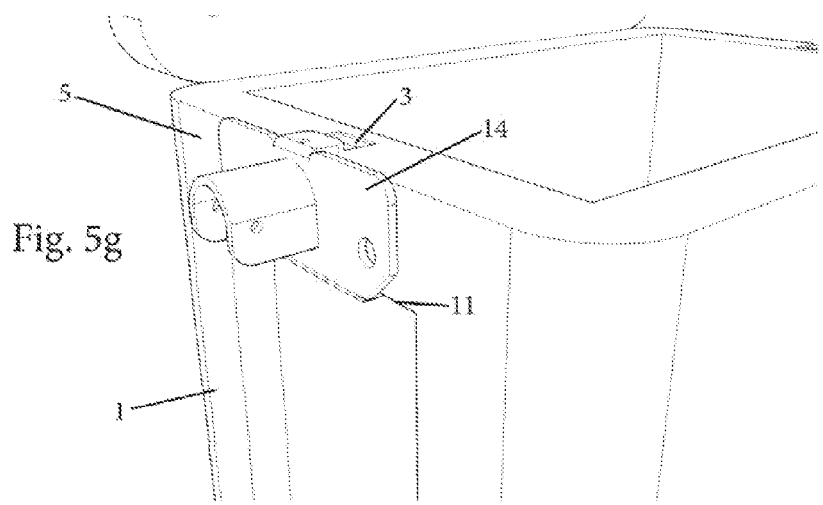

WHEELED SYSTEM FOR COOLERS

CROSS-REFERENCE TO RELATED APPLICATION

This non-provisional application claims priority to provisional application Ser. No. 61/895,042, filed on Oct. 24, 2013, which incorporated herein its entirety by reference.

FIELD OF INVENTION

This invention generally relates to wheeled-coolers, and in particular to a removable wheeled system for use with coolers.

BACKGROUND OF THE INVENTION

Typical wheeled coolers often include small plastic wheels and a telescoping handle to pull the over flat terrain. Such coolers typically are not well suited to carrying heavier loads over rough or difficult terrain, e.g., loose sand or rocky inclines. Moreover, with reference to FIG. 1, many larger or heavier coolers are not available with wheels or handles, leaving consumers to choose between wheeling a smaller/lighter cooler and carrying a larger/heavier cooler.

Accordingly, improvements are sought in wheeled transport of coolers within broader range of cooler sizes and loaded cooler weights.

SUMMARY OF THE INVENTION

While the way that the sent invention addresses the disadvantages of the prior art will be discussed in greater detail below, in general, the present invention provides a wheeled system mountable one the exterior of a cooler without modification to the cooler and without impeding access to the cooler interior.

One aspect of the invention features in some implementations, a wheel support securable to a trailing end of a cooler and a handle securable to a leading end of the cooler. The wheel support is securable to the cooler via connections to an upper rim of the cooler body. In some implementations, the connections are made via tie-down features formed in the upper rim of the cooler body, e.g., via straps or J-hooks inserted into tie-down passages formed in the cooler body. In some implementations, the connections are via engagement with the upper rim and interior cavity of the cooler body, e.g., via a J-hook inserted between the lid and body of the cooler.

In some implementations, the handle is similarly secured via connection to a tie-down feature or otherwise secured to the upper rim of the cooler body. In some implementations, the handle is secured via engagement with a handle recess formed in the body of the cooler. In some implementations, the wheel support and handle are secured by a strapping system extending between anchor points at upper of the leading and trailing cooler ends. In some implementations, the strapping system includes ratcheting, or camming tighteners for tensioning the strapping system to secure the wheeled support and handle in place on the cooler.

In some implementations, the wheels are spaced to be positioned within the width of the cooler body. In some implementations, the wheels are spaced to be positioned outside the width of the cooler body. Wider positioning provides a broader cooler base and resists tipping on inclined surfaces. In some implementations, the axle of the wheels is located below the trailing end of the cooler body. In some implementations, axle of the wheels is positioned adjacent a trailing end of the cooler body.

In some implementations, the wheel support defines an aperture for access to a cooler drain plug. In some implementations, the wheel support defines one or more apertures to receive a projection defined on the body of the cooler, e.g., a foot or other floor standoff feature of the cooler.

In some implementations, the wheel support includes a compressible material to reduce shock or abrasion to the cooler body during transport.

In some implementations, the wheel support provides for selectable wheel positioning, e.g., through provisions of a plurality of apertures therethrough for insertion of the axle in different positions relative to the cooler body.

In some implementations, a handle is configured for removable attachment to a leading end of the cooler, e.g., "the handle end". In some implementations, the handle folds down out of the way when not in use and then hinges up to a fixed load bearing position. In some implementations, the handle is moveable into engagement with a stop in an extended position to elevate the leading end of the cooler relative to the wheeled trailing end of the cooler. In some implementations, the handle length is adjustable. In some implementations, the handle is a telescoping handle, e.g., with a pin lock or other securing mechanism. In some implementations the handle is a T-bar, L-shaped or J-shaped handle. In some implementations, the handle is configured for a full-handed grip. In some implementations, the handle is moveable between a stowed position and a deployed position. In some implementations, the handle serves as a cooler prop for the leading end of the cooler in the stowed position.

In some implementations, a handle support with a telescoping switch-grip handle is configured to attach to molded-in handles present on YETI® brand coolers. The handle's various selectable telescoping lengths allow the user to stand upright while maintaining a comfortable distance from the cooler while walking, e.g., without bumping the cooler into the user's heels. In some implementations, the handle is configured for gripping with either the right or left handed.

In some implementations, at least one of the handle and the wheel support are configured for attachment to the cooler via one or more tie-down apertures formed in the body of the cooler. In some implementations, the tie-down aperture(s) is defined between an upper rim of the cooler body and a handle recess formed in the ends of the cooler body.

In some implementations, at least one of the handle and the wheel support are configured for attachment to the cooler via anchor points disposed between the body and lid of the cooler. In some implementations, the anchor point is configured as a tie-down passage. In some implementations, the tie-down passage extends from the upper rim of the cooler body into a handle recess formed in the cooler body. In some implementations, straps are insertable into the tie-down passage to secure the wheel support and/or handle to the cooler. In some implementations, J-hooks or other connectors at the end of a strapping system are insertable into the tie-down passages. In some implementations, the tie-down passages are at least partially covered by the closure/lid of the cooler.

In some implementations, the J-hook or other anchor insertable into the tie-down feature of cooler defines an aperture for insertion of as lock, e.g., a cable look. Alternatively, in some embodiments, the handle support is lockable to a cooler body, e.g., via one or more apertures defined in the handle support to receive a lock or cable lock therethrough. In some cases the anchor and/or handle positions the locking aperture spaced apart from the cooler body to allow insertion lock, e.g., locking cable. In some cases, the anchor is offset from the tension connector, e.g., strap, such that the lock or lock installation does not interfere with the tension connector.

Another aspect of the invention features, in some implementations, a handle and wheel support configured for attachment to a cooler via tie-down passages defined in body of the cooler. In some implementations the tie-down passages open into a cooler handle recess such that the handle and wheel supports are at least partially anchored via the cooler handle recess.

In some implementations, at least one of the handle and the wheel support are configured for attachment to the cooler via anchor points disposed on the exterior of the cooler. In some implementations, a handle recess formed on the exterior of the cooler serves to anchor at least one of the handle and wheel support. In some implementations, a handle support engages a handle recess defined in the cooler body by one or more projections extending upward into the handle recess. In some implementations the handle projection includes a substantially continuous rail extending substantially the length of the handle recess formed in the cooler body. In some implementations, the handle projection engages at least two substantially spaced apart portions of the handle recess formed in the cooler body. In some implementations, the handle projection engages a central portion of the handle recess formed in the cooler body.

For example, the handle and bracket can be configured to fit the molded-in handle brand cooler. A carabineer or alter quick-release mechanism can be used to secure the handle support to the cooler, e.g., through tensioning of a rigid or flexible connector is seated through an integrated tie-down slot formed in the cooler. The connector, e.g., a double SS buckle strap and bracket allow for unlimited compatibility with any size cooler and offer ease of installation and disassembly.

In some implementations, the wheel support engages an exterior feature of the cooler to prevent relative side-to-side slippage between the wheel support and cooler. Such exterior features can include cooler feet, handle recesses or other body contours.

In some implementations, the wheeled system includes one or more straps or other tension connector extending between the trailing end of the cooler, through the wheel support, beneath the cooler, and to the handle at the leading end of the cooler. In some implementations, two straps provide secure attachment of the wheel support and handle to the cooler body. In some implementations, the straps include a tightener such as a ratcheting or camming tightener. In some implementations, multiple straps secure the wheel support and handle to the cooler. In some implementations, a single recursive strap secures the wheel support to the cooler.

In some implementations, the wheeled system includes a locking mechanism to disable at least one of the handle and the wheels. In some implementations, the wheel support includes a brake and the handle includes a brake actuator. In some implementations, a control cable extends between the handle and the wheels support to control one or more of a wheel lock and a brake.

In some implementations, the wheeled system includes a leading end cooler prop to maintain the cooler level atop the wheel support. In some implementations, the handle is configured to serve as a cooler prop/stand in a stowed position to maintain the cooler level atop the wheel support.

In some implementations, the wheeled system includes anchors insertable between the body and lid of the cooler. In some implementations, the anchors are J-hooks. In some implementations, the anchors are received in a tie-down feature of the cooler. In some implementations, the anchors extend into an interior cavity of the cooler.

In some implementations, the handle is secured between a handle recess defined in the cooler body and a top edge/rim of the cooler body. In some implementations, the handle includes an upward projection receivable in the handle recess of the cooler body. In some implementations, the handle includes a downward projection receivable in one of a tie-down feature and the cooler interior. In some implementations, the handle is securable via both an upward projection receivable in the handle recess defined in the cooler and an anchor, e.g., downward projection or strap, receivable in one of a tie-down feature and the interior of the cooler.

In some implementations, the wheel support comprises at least one of steel, stainless steel, aluminum, plastic, impact nylon, composite material, starboard or other suitably durable material.

In some implementations, the wheels include at least one of solid rubber tires, pneumatic tires, balloon tires, foam tires, and resilient honeycomb tires.

Preferably, the wheeled system does not interfere with opening of the cooler lid. In some implementations, the wheeled system does not interfere with use of the cooler drain plug. In some implementations, the wheeled system does not interfere with use of preexisting cooler handles or cooler grips. In some implementations, the wheeled system need not be removed to allow for opening of the cooler lid, unstopping of the cooler drain plug, or lifting of the cooler via preexisting cooler handles.

In some implementations, the wheel support and handle are independently secured to the exterior of the cooler. In some implementations, the wheel support and handle are connected together by a tension connector such as a strap.

In some implementations, the wheel support is secured to the trailing end of the cooler. In some implementations, the wheel support extends across a portion of both the bottom and the trailing end of the cooler. In some implementations, the wheel support primarily engages the bottom of the cooler.

In some implementations, the axle of the wheels is positioned below the bottom of the cooler. In some implementations, the axle of the wheels is positioned above the bottom of the cooler. In some implementations, the wheels are moveable between an axle position rearward of the trailing end the cooler and an axle position forward of the trailing end of the cooler. In some implementations, the spacing between the wheels is variable or selectable to accommodate a range of cooler sizes. Various axle positions can provide for variable ground clearance through repositioning of the axle relative to the wheel support.

In some implementations, the wheel support defines apertures disposed towards each of the wheels for passage of the strap therethrough. In some implementations, the straps have one or more common anchor point(s) on the cooler body.

In some implementations, at least one of the wheel support and the handle is secured to the cooler via, a strap comprising at least one of: woven fabric, steel strapping, plastic strapping, parachute chord, webbing or other suitable tension connector material.

In some implementations, the wheel support includes attachment points for securing, additional cargo. In some implementations the wheel support and/or handle accommodates attachment of drink containers, bottle openers, electronics, gear bags, and/or camping, fishing or hunting equipment.

Thus, the present invention provides a wheeled system for use with a range of coolers and includes a wheel support and handle secured to existing features of the cooler. The handle and wheel support can be secured via a shared strapping system or the handle may be secured independently to a handle recess formed in the cooler body. The wheel support and handle can be secured using tie-down apertures formed in the cooler body. An advantage of the present invention is ease of transport of heavy or large coolers, in particular over rough, loose, inclined or uneven terrain. The wheeled system offers greater mobility for coolers without needing to modify the cooler and without diminished access to or use of the cooler interior.

BRIEF DESCRIPTION OF THE DRAWINGS

A more complete understanding of the present invention may be derived by referring to the detailed description and claims when considered in connection with the Figures, wherein like reference numerals refer to similar elements throughout the Figures.

FIGS. 5a-g depict views of various steps in securing the handle and/or wheel support to the cooler.

DETAILED DESCRIPTION

The following description is of exemplary embodiments of the invention only, and is not intended to limit the scope, applicability or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, securing mechanisms and the like and still fall within the scope of the present invention. Thus, the detailed description herein is presented for purposes of illustration only and not of limitation.

Reference in the specification to "one embodiment/implementation," or "an embodiment/implementation," is intended to indicate that a particular feature, structure, or characteristic described in connection with the embodiment/implementations is included in at least an embodiment/implementation of the invention. The appearances of the phrase "in one embodiment/implementation" or "an embodiment/implementation" in various places in the specification are not necessarily all referring to the same embodiment/implementation.

Figure 1:
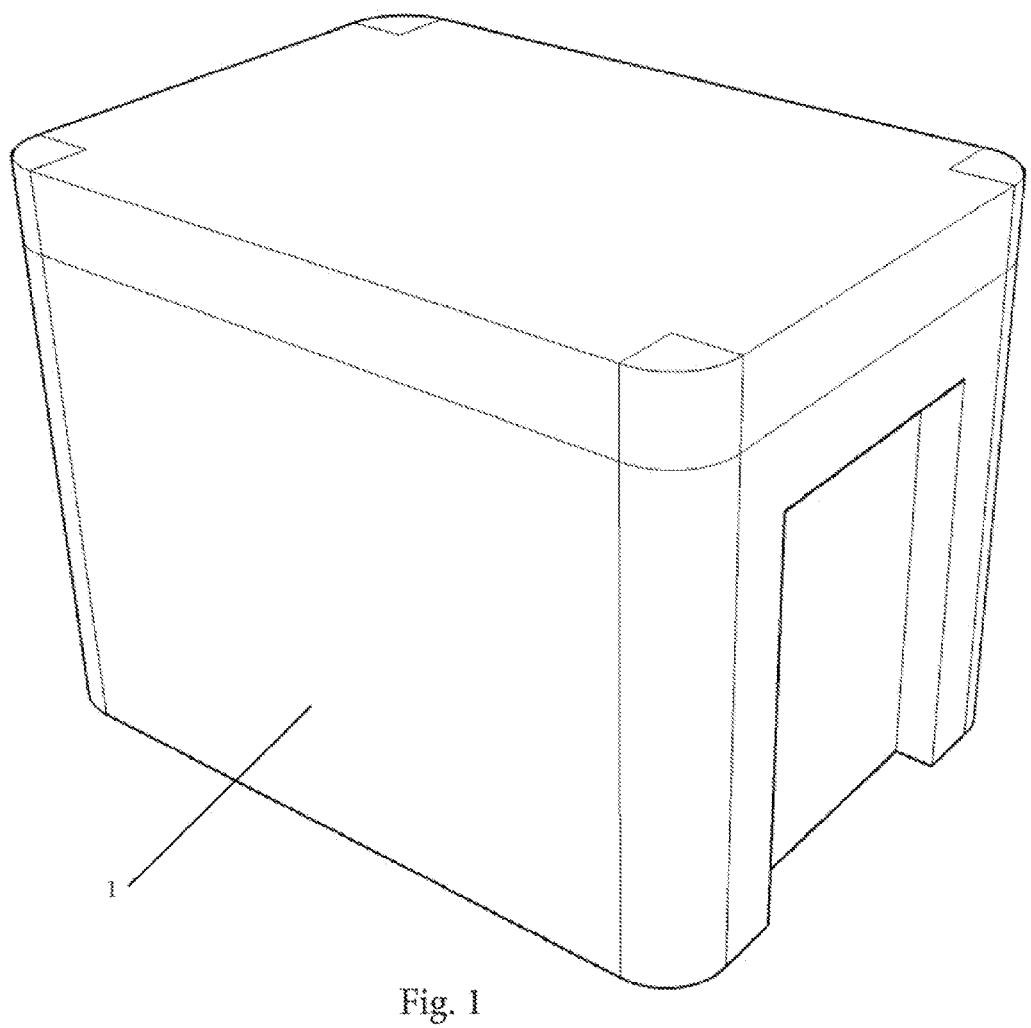
FIG. 1 illustrates a prior art cooler having handles but no wheels for cooler transport.

With reference to FIG. 1, many existing prior art coolers 1 include handles but no wheels for cooler transport. Often smaller, lighter coolers offer small integral wheels for transport of lighter loads over general flat, solid terrain.

Figure 2:
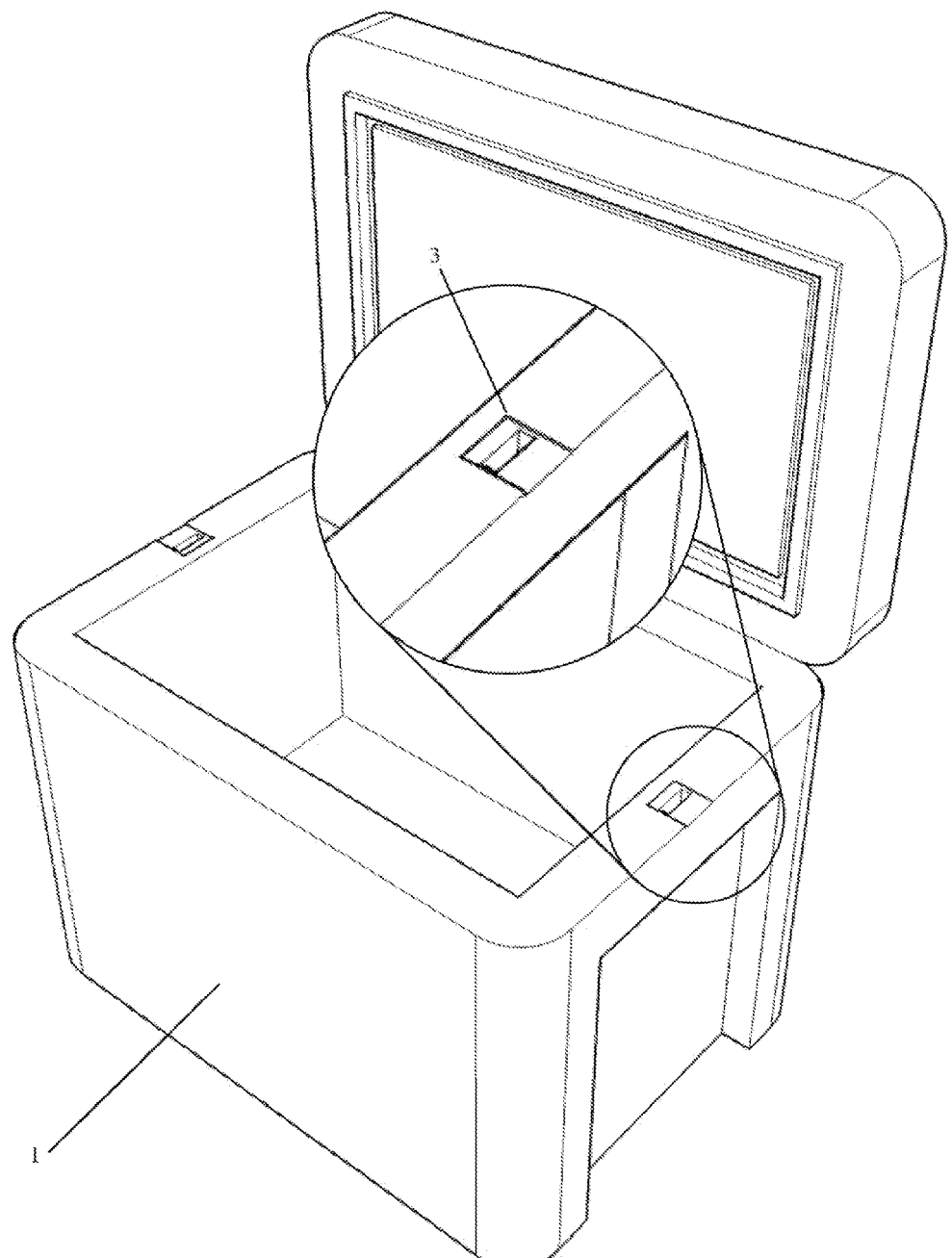
FIG. 2 illustrates a prior art cooler having anchor points defined on the body of the cooler.

With reference to FIG. 2, an example of a heavy duty cooler 1 is illustrated having anchor points or tie-down features 3 defined on the body of the cooler for securing of the cooler in place, but lacking a wheeled system for ease of manual transport. In particular, the cooler defines anchor points or tie-down features 3 at either end of the cooler in an upper or rim portion of the cooler body. In general, coolers 1 include a body portion defining an interior cavity and a closure portion hinged to or minable with the body portion to seal the interior cavity against air or heat from the outside. The cooler body often defines handle recesses and/or outwardly moveable stowed handles on the cooler ends for ease of lifting the cooler. Coolers often include a drain plug at one or both ends for release of water from melting of ice. Additional cooler features may include latching or locking mechanisms, tie-down features, drink holders, etc.

Aspects of the present invention provide a wheeled system for use with larger and/or heavier coolers for transport of heavier loads over rougher, less stable or inclined terrain. The described wheeled system is particularly useful with heavy duty coolers being offered for more rigorous outdoor use.

Figure 3A:
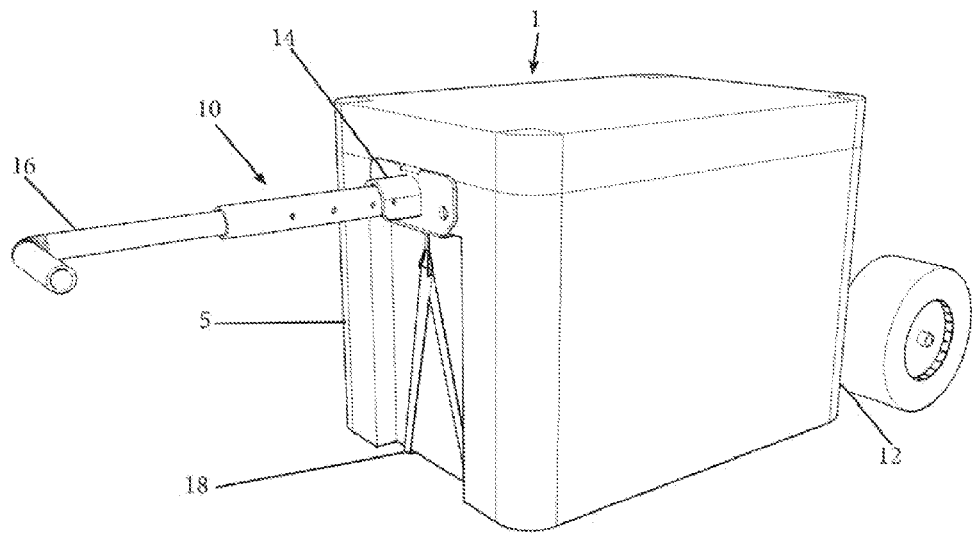
FIGS. 3a-b are perspective views illustrating a wheeled system according to one embodiment wherein the wheel support and handle are secured to anchor points of the cooler.
Figure 3B:
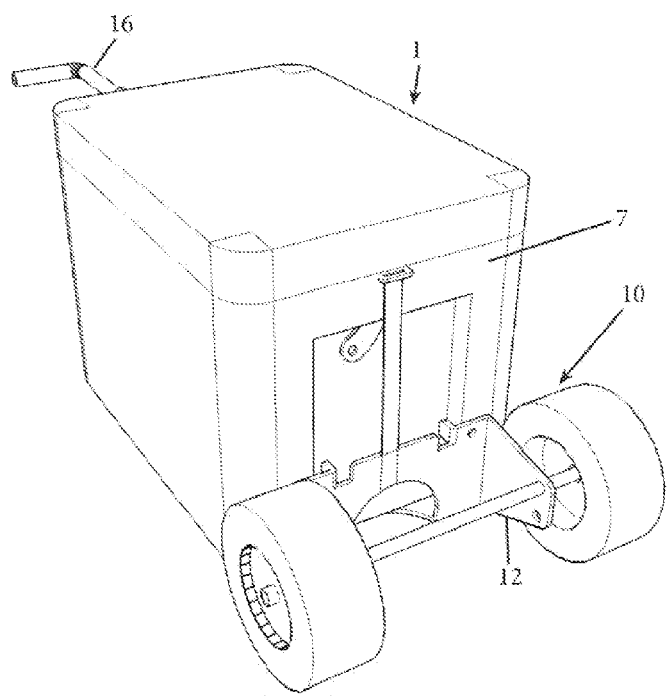

FIGS. 3a-b are perspective views illustrating a wheeled system 10 according to one embodiment wherein a wheel support 12 and handle support 14 are secured to the tie-down features 3 of FIG. 2 or other similar anchor points on cooler 1. Attachment of wheeled system 10 is described with reference to a leading end 5 and a trailing end 7 of the cooler during wheeled transport, i.e., the left and right sides of the cooler where integral cooler handles are typically located.

Wheel support 12 is secured to trailing end 7 of cooler 1 extending across a portion of the bottom of the cooler. A handle 16 is pivotal attached to handle support 14 secured to leading end 5 of cooler 1. Handle support 14 and wheel support 12 are each secured via straps 18 extending to respective tie-down or anchor points 3 at respective ends of the cooler. Handle support 14 and wheel support 12 can be secured independently or with a shared strapping system 18 or other tension connection system. Wheeled system 10 preferably does not interfere with operation of the lid, drain plug, or other existing features of the cooler.

Figure 4A:
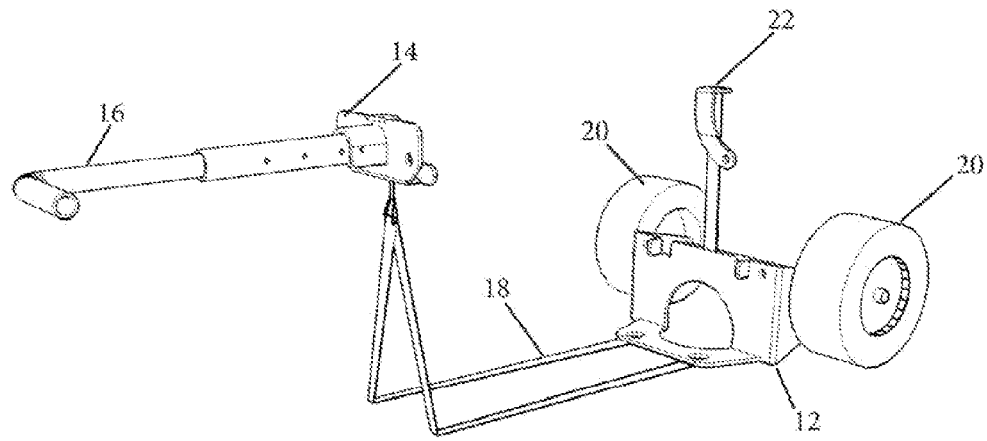
FIGS. 4a-b depict perspective views of the wheeled system of FIG. 3.
Figure 4B:
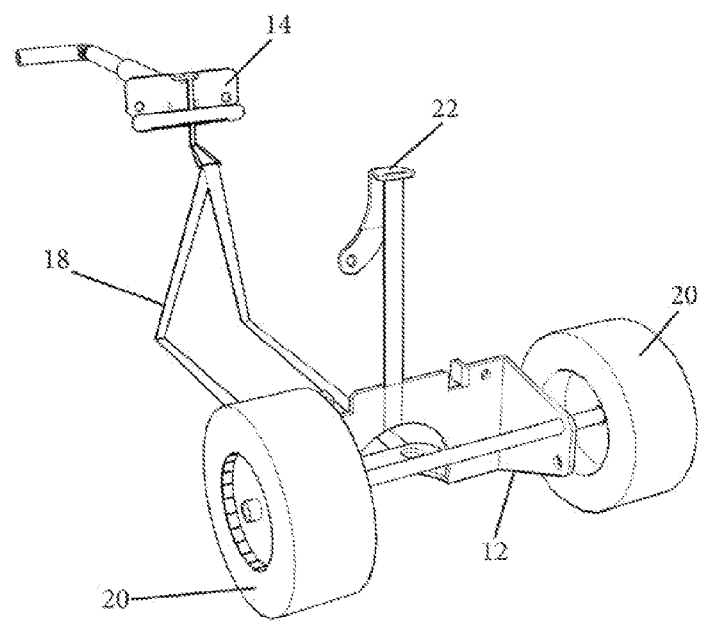

With reference to FIGS. 4a-4b, exploded views of the wheeled system of FIGS. 3a-3b illustrate wheel support 10, wheels 20, handle support 14, handle 16, straps 18, J-hook anchor 22 in their general assembled relationships. It will be appreciated that a wide range of cooler sizes can be accommodated by adjustment of the strap length and that a wide range of cooler designs may be accommodated by use of different J-hooks or other anchors 22 suitable to engage features of a particular cooler at the strap ends. For example, in some implementations, J-hook anchors 22 may extend into the cooler interior over the rim of the body of the cooler. In some implementations, strap 18 may be passed through a tie-down feature to obviate anchor 22.

With reference to FIG. 5a-5g, installation of J-hook anchor 22 is illustrated via insertion into the molded-in tie-down feature passage 3 formed in the cooler body. Anchor 22 can include a locking feature, a cable lock hole for securing both the wheeled system and cooler. In some implementations, anchor 22 is provided only at one end of the cooler for securing wheeled system 10. In some implementations, anchors 22 are inserted into tie-down features 3 at both ends of the cooler to secure wheeled system 10 to the cooler. Alternatively, straps 18 may be passed directly through tie-down features 3 to obviate the need for anchors 22. Nonetheless, anchors 22 can provide for easier installation, more robust design and for locking of the wheeled system cooler.

Figure 5A:
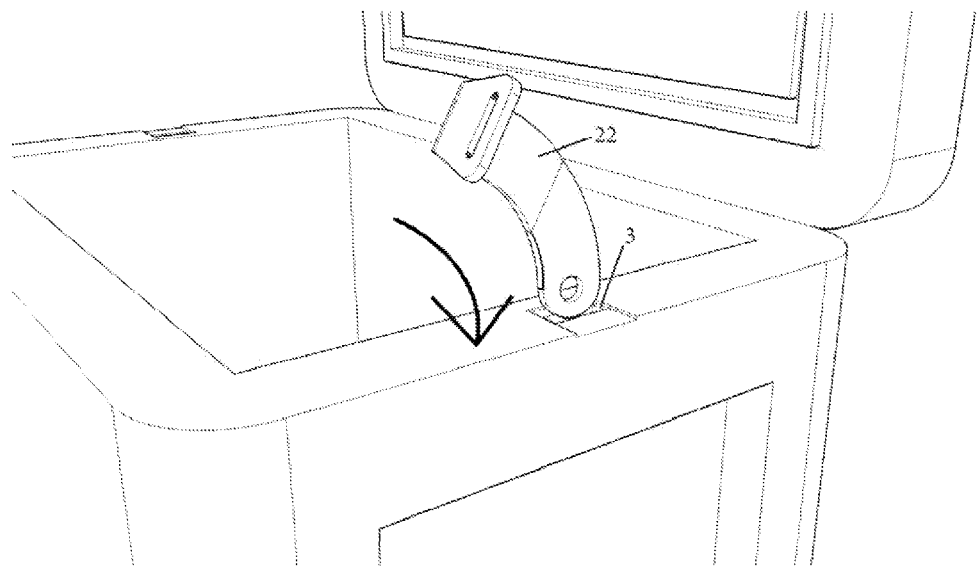
Figure 5B:
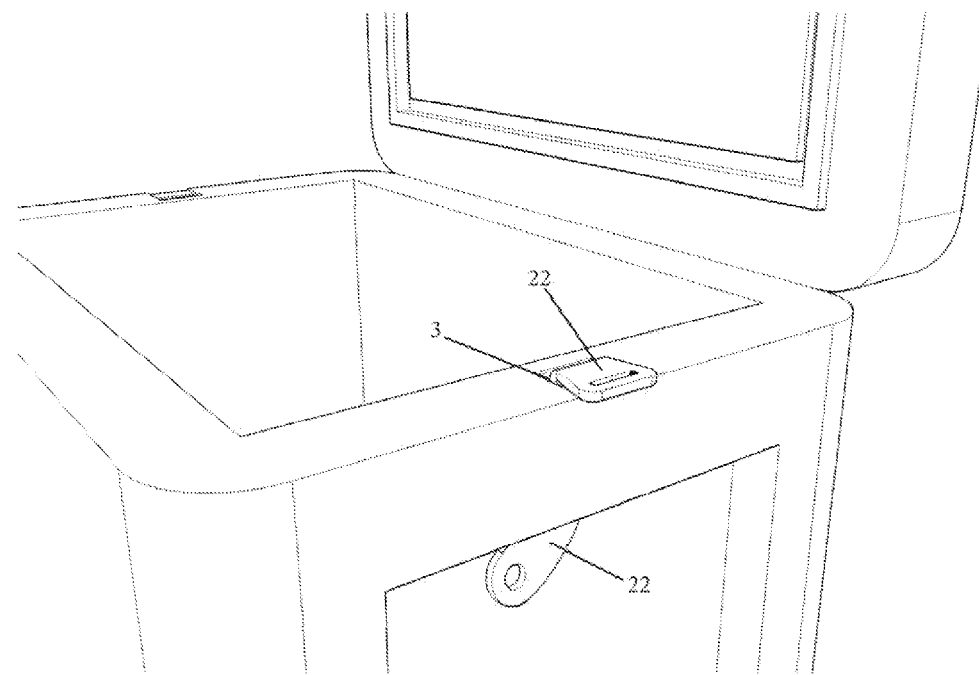
Figure 5C:
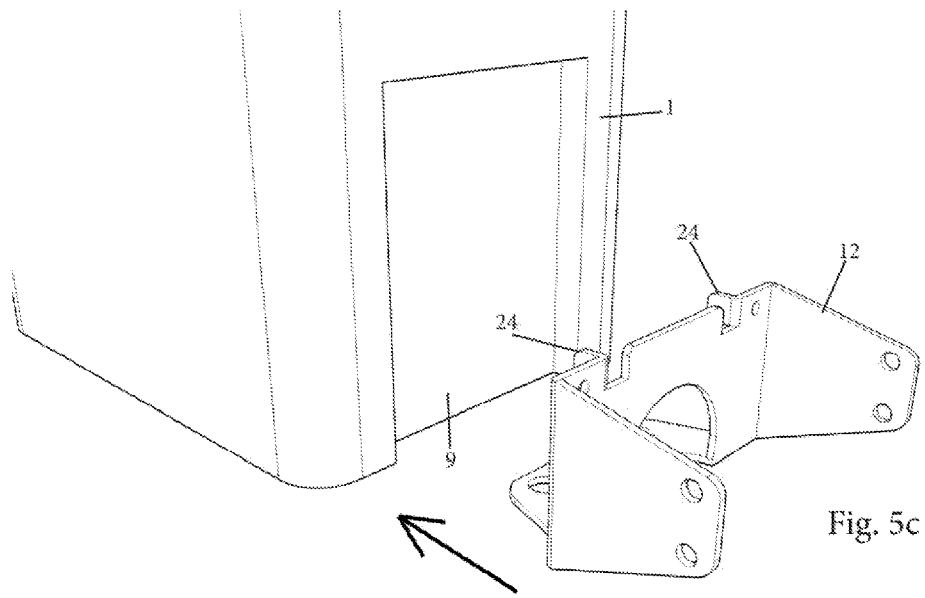
Figure 5D:
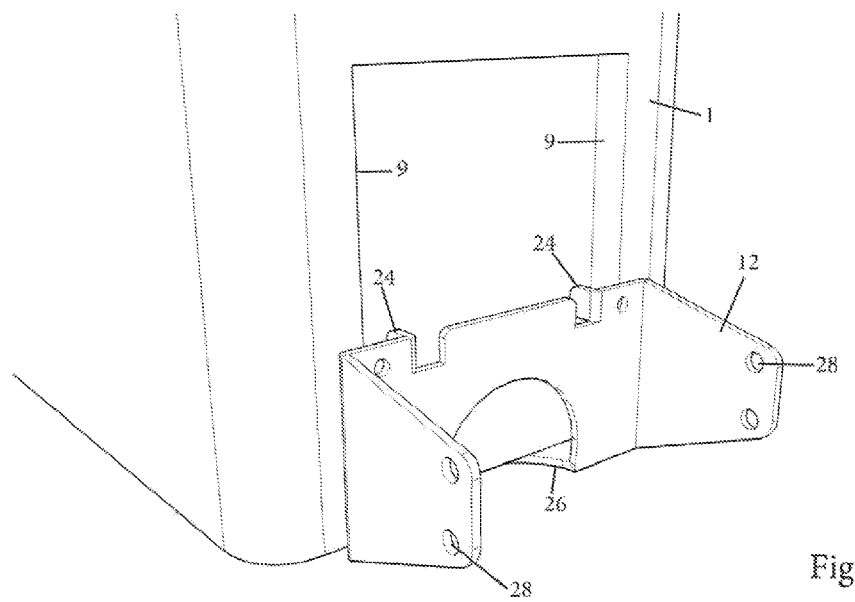
Figure 6A:
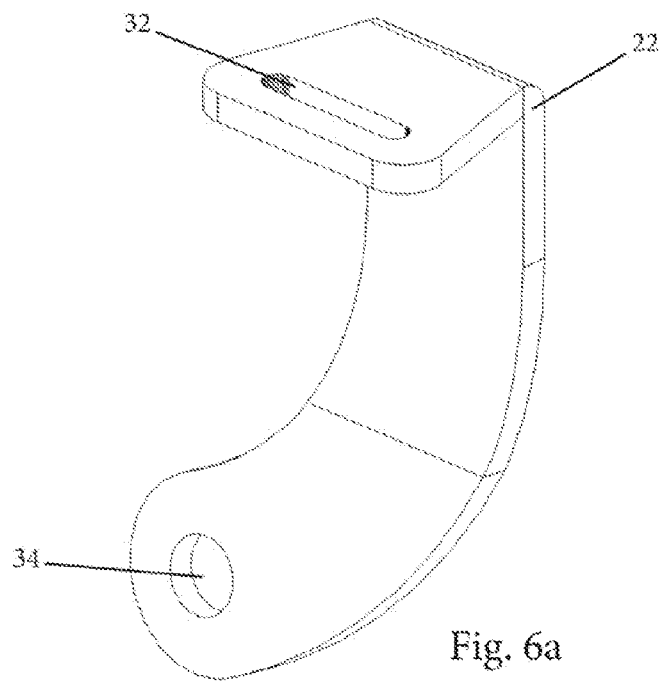
FIGS. 6a-d depict enlarged views of a J-hook for securing the handle and/or wheel support to the anchor point, in some embodiments.
Figure 6B:
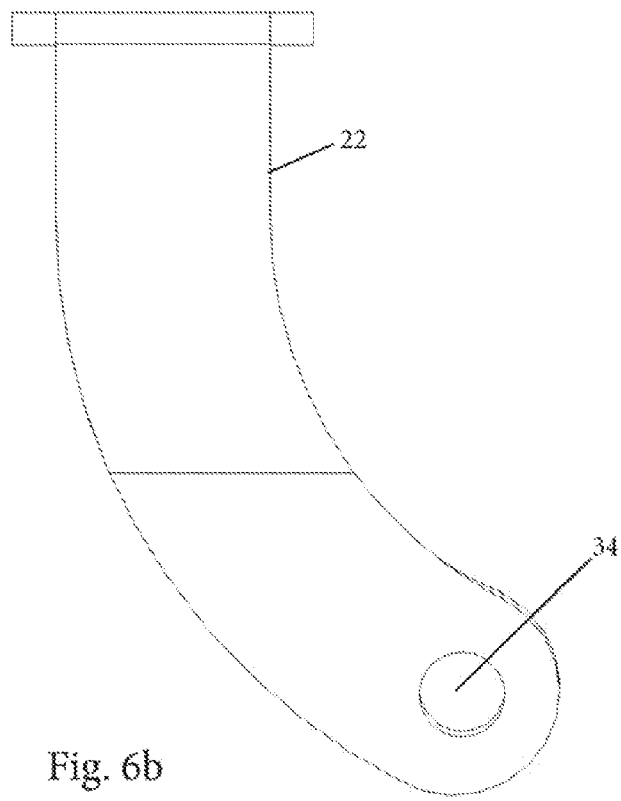
Figure 6C:
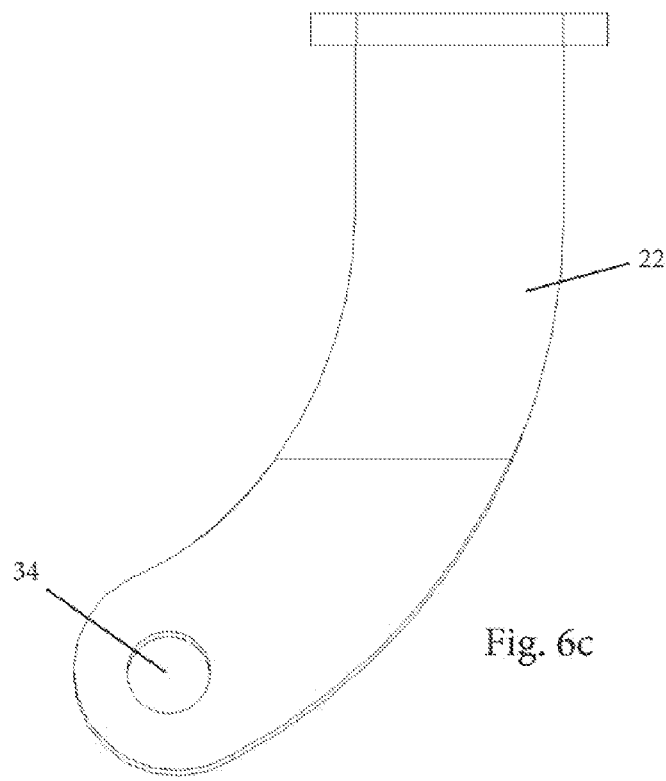
Figure 6D:
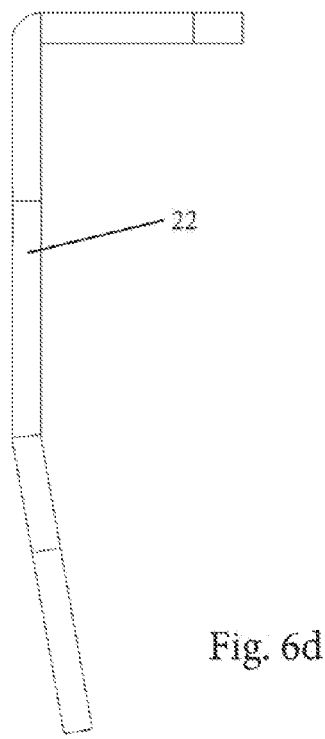
Figure 7A:
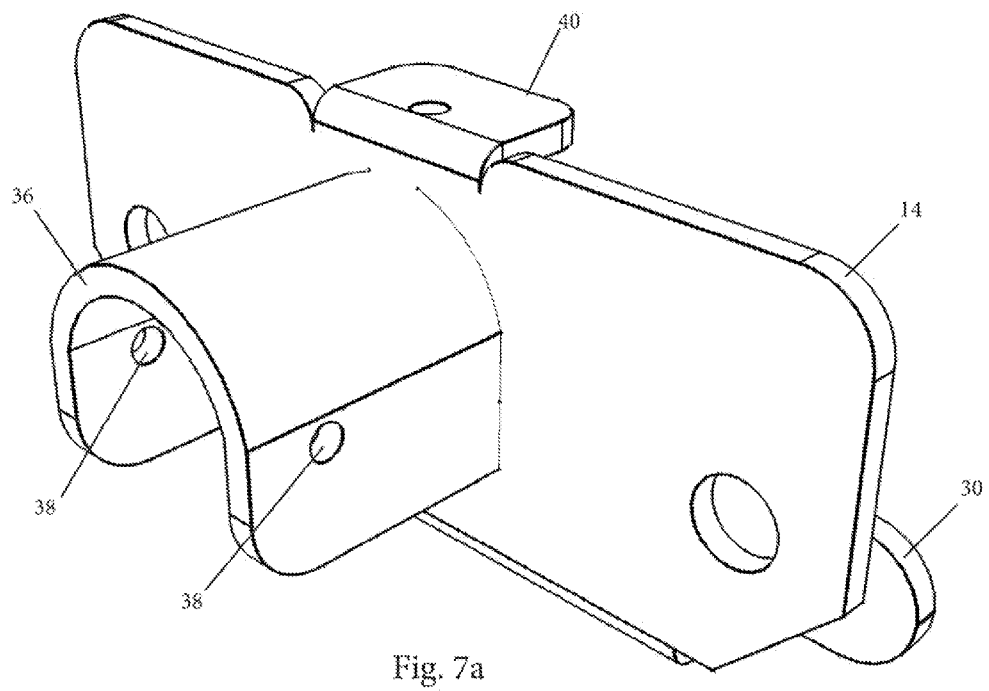
FIGS. 7a-d depict perspective, front, rear and side views of one embodiment of a handle.
Figure 7B:
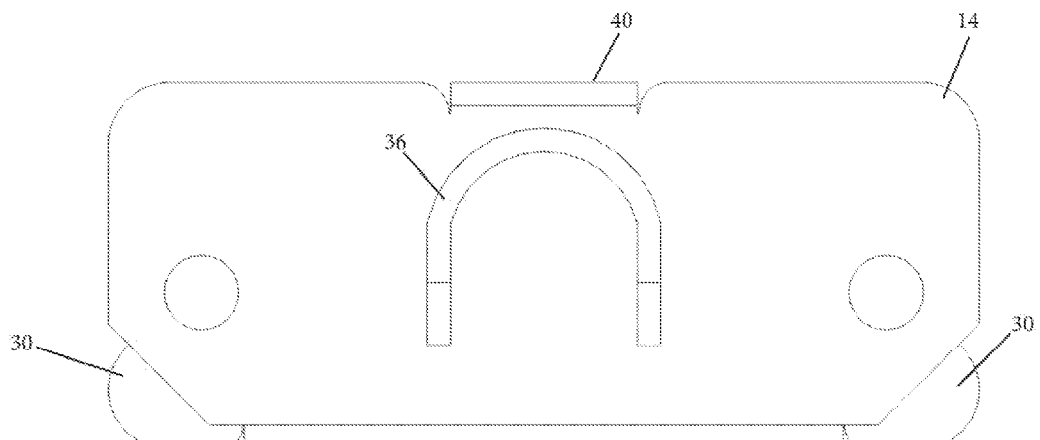
Figure 7C:
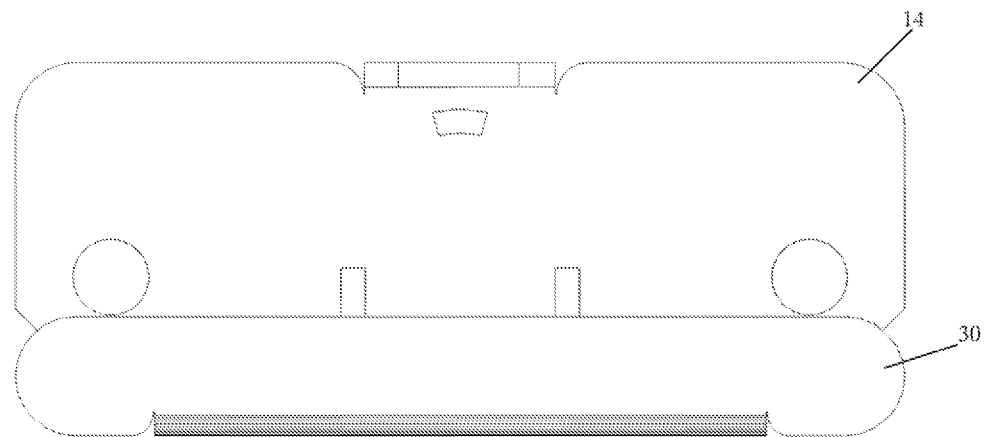
Figure 7D:
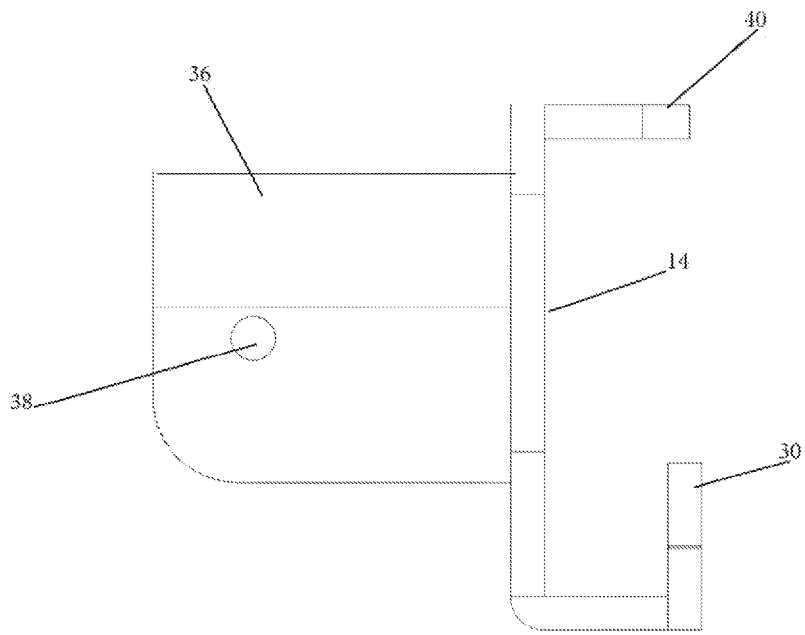
Figure 8A:
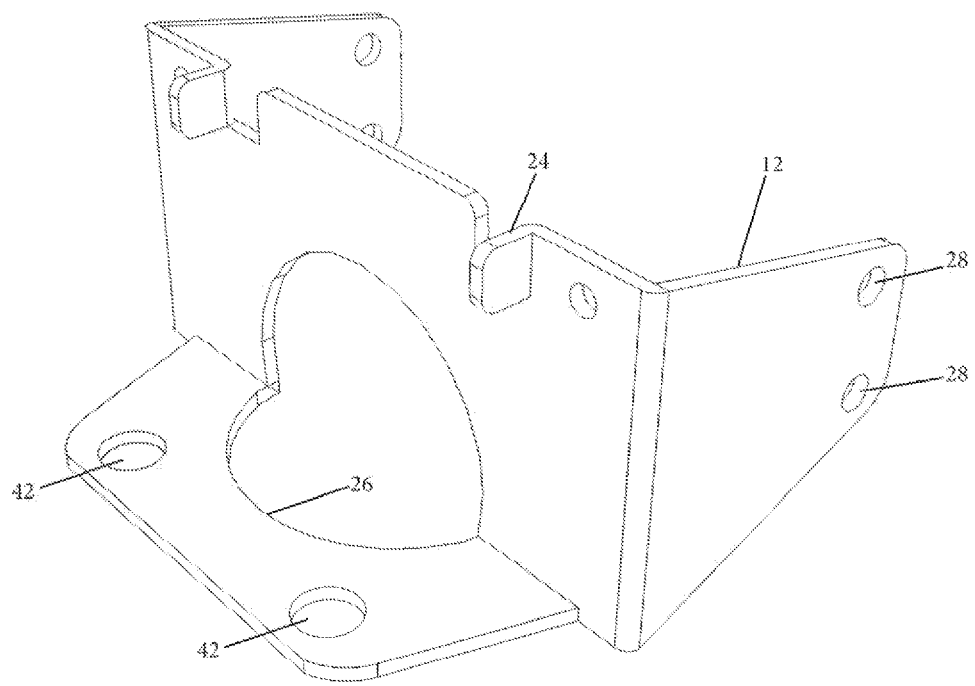
FIGS. 8a-d depict perspective, front, rear, and side views of one embodiment of a wheel support.
Figure 8B:
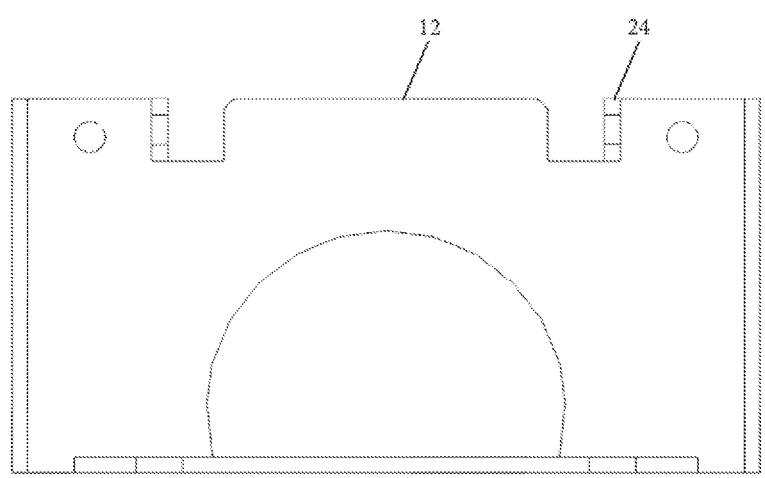
Figure 8C:
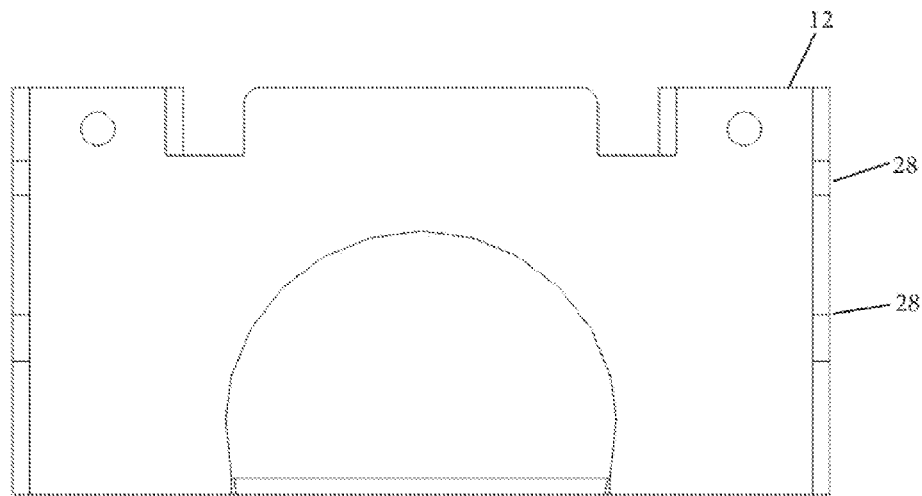
Figure 8D:
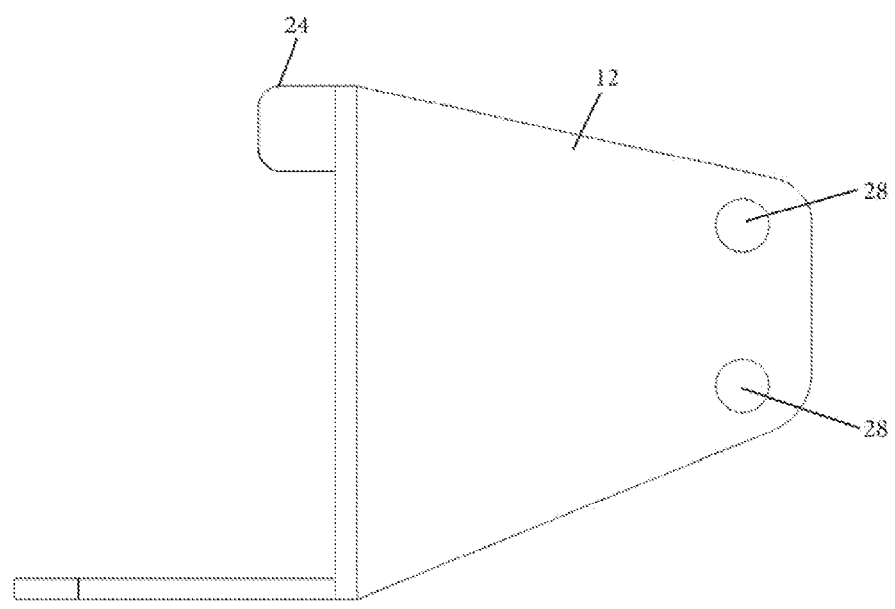

With reference to FIG. 5c-5d, an enlarged view of wheel support 12 is illustrated engaging an inset body contour 9 formed in the cooler body. Projections 24 extend from wheel support 12 to engage body contour 9 to maintain wheel support 12 substantially aligned or centered on the trailing end of cooler 1. Any number of shock absorbing, pads and other cooler engaging features may be used to suitably position the wheeled system on the cooler while protecting the cooler from impact or abrasion during transport.

Wheel support 12 further defines multiple axle passages 28 to receive an axle therein. For example, multiple sets of axle passages 28 can provide for selection of different axle positions relative to the cooler body. For example, in some situations, it may be desirable to have more ground clearance during transport and the axle can be positioned in the lower set of axle passages 28. Wheel support 12 can further define a passage 26 to provide access to any water drains commonly present on the lower end wall of coolers.

With reference to FIGS. 5e-5f, an enlarged view of handle support 14 is illustrated during various stages of installation into a molded-in handle 11 and tie-down feature/passage 3 formed in the cooler body. First an upwardly extending projection 30 is positioned within the grip well or molded-in handle 11 formed in cooler 1. Projection 30 can be a substantially continuous rail projection co-extensive with handle 11 or can include any number of smaller projections space apart to engage handle 11. Next, handle support 14 is rotated into engagement with the face of leading end 5 of cooler 1. Handle support 14 is maintained in position using a strap or other connector inserted into tie-down feature 3 adjacent the top of handle support 14.

FIGS. 6a-6d depict various views of J-hook anchor 22 for insertion into tie-down features 3 on cooler 1 and for scenting of wheeled system 10 to cooler 1. Anchor 22 defines an aperture 32 to receive straps 18 and to support the tension forces required to secure the wheeled system 10 to cooler 1. In some implementations, anchor 22 is inserted into a tie-down feature 3 positioned at least partially below the closed lid of the cooler and a portion of anchor 22, e.g., aperture 32, extends from between the cooler lid and cooler body for attachment of strap 8.

In some implementations, a locking aperture 34 is define in anchor 22 to receive a lock or locking cable therethrough for securing the wheeled system to the cooler and for securing the cooler, e.g., in a vehicle. Anchor 22 can be curved in one or more directions to provide easy access to locking aperture 34 for installation or a lock or cable therethrough.

FIGS. 7a-7d depict perspective, front, rear and side views of one embodiment of a handle support 12. Handle support 12 is secured to the leading end of the cooler via tie-down features or anchor points 3 and/or handle recesses 11 formed in the cooler. Handle support 12 provides a handle stop 36 and pivot point for handle 16 to be moved between stowed and deployed positions. In the deployed position, handle 16 abuts handle stop 36 such that the user may raise the leading end of the cooler for transport. Handle stop 36 can be configured to be substantially complimentary to the contour of an arm of handle 16, e.g., rounded to compliment and mate with a round handle arm to spread the load evenly.

Handle support 14 includes an upward projection 30 configured to extend into and engage the handle recess 11 formed in the exterior of the cooler body. Projection 30 can be a substantially continuous rail or can include any number of separated projections along a length of handle recess 11.

Handle support 14 is maintained within handle recess 11 by tab 40 or other securing means extending over at least a portion of the top rim of the cooler body. In some implementations, the tab 40 extends across a portion of the rim and down through tie-down passage 3 opening into handle recess 11 formed in the cooler body. In some non-illustrated embodiments, tab 40 extends across the upper rim of the body and into the interior cavity of the cooler. In some embodiments, tab 40 may be used with an anchor 18 that extends partially into a tie-down passage or over the edge of the interior cavity. In some embodiments, strap 18 or other connector extends through the tie-down passage 3.

With continued reference to FIGS. 7a-d, upward projections 30 or "lugs" extend upward from handle support 14 to be received by handle recesses 11 formed in the cooler body. The "lug" can include a single rail or multiple projections extending into the handle recesses, much as with a user's hand or fingers.

In some implementations, the pivot of the handle extends through opposed handle bracket portions, one associated with the lower handle recess and one associated with the upper tie-down feature, such that insertion of the pivot through the handle support portions fixes the handle securely at the leading end of the cooler. Thus handle support 12 can be secured to cooler 1 independent of straps 18.

Additionally or alternatively, handle support 14 can provide an attachment point for straps 18 to secure wheel support 14 to cooler 1. Strap 18 extending forward from wheel support 12 can be secured to handle support 14. In some implementations, strap 18 serves to secure handle support 14 to the cooler. For example, strap 18 can pass through tie-down passage 3 between the handle recess 11 and the upper rim of the cooler body and be secured to handle support 14. Tension in strap 18 then serves to maintain handle support 14 in close contact with the cooler body as the strap pulls the handle support towards the tie-down passage and into the handle recess on the cooler body. Thus, handle support 12 may be secured to the cooler independent of wheel support 14 or in combination with a shared strapping system. Stated otherwise, wheel support 14 may be secured to the cooler body with a strap 18 extending between the leading and trailing ends of the cooler. The handle support may be partially secured using the same strap, or may be independently secured using exclusively leading end cooler features.

FIGS. 8a-8d depict perspective, front, rear, and side views of one embodiment of wheel support 12. Wheel support 12 positions a pair of wheels at the trailing, end of the cooler for ease of transport. As shown in FIG. 4a, the axle is depicted as being positioned rearward and upward of a lower trailing edge of the body of the cooler. In other embodiments, the axle(s) are positioned forward and/or downward of the lower trailing edge of the body of the cooler. The wheel support defines apertures 42 configured and arranged for receipt of strap 18 therethrough. Apertures 42 are spaced apart, proximate the respective wheels, to distribute strap tension broadly across wheel support 12. Spreading of the strap tension serves to help maintain wheel support 12 centered on the cooler and to minimize relative side-to-side slippage of the wheel support relative to the cooler body.

The various wheeled system components may be constructed from a wide variety of materials. For example, the wheel support and/or handle support may be constructed of aluminum, steel, plastic, composites, or other suitable structural materials. The tires may be of solid rubber, pneumatic, foam, or honeycomb construction. The wheels may be affixed at opposite ends of a common axle extending the width of the wheel support or may be affixed to independent short-shaft axles projecting from the wheel support.

An aperture is defined in a central region of the wheel support to provide continued access to a cooler drain plug.

While not illustrated, any number of additional projections or apertures may be provided to engage with or accommodate features of a particular cooler design. For example, engagement with feet, body contours, handle recesses, and the like can provide affirmative resistance to side-to-side or other movement of the wheel support relative to the cooler body. Similarly, accommodation may be required of exterior features of the cooler body, e.g., posts, fasteners, or body contours to allow for a close fit. Accordingly, the wheel support may be configured and arranged with an number of contact points or contact surfaces relative to a given cooler design, and should not be limited to the generally right-angled plate design illustrated.

Similarly, while the present invention has been described herein as a wheeled system for coolers, the present invention may be readily used with any number of storage, or shipping containers or other similar devices now known or hereafter developed. This wheeled system is easy to use, adjustable to a range of cooler sizes, and breaks down to a small, packable or stowable form.

Finally, while the present invention has been described above with reference to various exemplary embodiments, many changes, combinations and modifications may be made to the exemplary embodiments without departing from the scope of the present invention. For example, in some implementations, at least one of the handle and the wheel support may be configured for attachment to the cooler via anchor points disposed on the lid of the cooler. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A wheeled system for coolers, comprising:
    a wheel support;
    a handle support configured to engage a recessed handle defined in a body of a cooler;
    a tension connector connectable to the wheel support and the handle support; and
    an anchor configured to engage a tie-down feature on the body of the cooler and connectable to the tension connector.

2. The wheeled system of claim 1, wherein the anchor is configured such that engagement with the tie-down feature is at least partially maintained by closure of a lid of the cooler.

3. The wheeled system of claim 1, wherein the handle support is configured to be securable to the cooler using both a recessed handle formed in the cooler body and a tie down feature formed in the cooler body.

4. The wheeled system of claim 1, wherein the tension connector is configured to extend the handle support at a leading end of the cooler and a tie-down feature at a trailing end of the cooler body to secure the wheel system to the trailing end of the cooler body.

5. The wheeled system of claim 1, further comprising a telescoping handle extending from the handle support and being movable from a first stowed position to an elevated deployed position.

6. The wheeled system of claim 1 wherein the wheel support defines axle positioning apertures to accommodate an axle therethrough in at least a first position and a second position.

7. The wheeled system of claim 1, wherein the wheel support engages a lower trailing edge of the cooler body and defines a passage for draining of water from within the cooler body.

8. The wheeled system of claim 1, wherein the tension connector and wheel support are configured such that the tension connector engages the wheel support at two spaced apart locations to maintain the wheel support substantially centered on the cooler body through tension of the tension connector between a central tie-down location and a central handle support location.

9. The wheeled system of claim 1, further comprising a tightener for placing the tension connector in tension.

10. The wheeled system of claim 1, wherein the wheel support is configured to engage an external feature of the cooler body to substantially limit side-to-side movement of the wheel support relative to the cooler body.

11. The wheeled system of claim 1, further comprising a telescoping handle coupled to the handle support, wherein the telescoping is moveable between a right-handed gripping position and a left-handed gripping position.

12. A wheeled system for coolers, comprising:
    a wheel support;
    a handle support configured to engage a recessed handle defined in a body of a cooler; and
    a tension connector connectable to the wheel support and the handle support;
    wherein, the handle support comprises one or more upwardly extending projections configured to engage at least one of a recessed handle and a grip recess presented on an exterior of the cooler body.

13. A method of installing a wheeled system for coolers, comprising:
    inserting a rigid handle support into a recessed handle defined on the exterior of a cooler body;
    positioning a wheel support along a lower edge of the cooler body; and
    extending a tension connector between the handle support, wheel support and an anchor point defined on the cooler body to thereby secure both the handle support and wheel support to the cooler body.

14. The method of claim 13, further comprising inserting an anchor through a passage defined in a cooler body for connecting the tension connector to the tie-down feature.

15. The method of claim 14, further comprising retaining the handle support within the handle recess at least in part using a tie-down feature defined on the cooler body.

16. The method of claim 15 wherein the tie-down feature extends into the handle recess and using the tie-down feature includes passing a connector through the tie-down feature into the handle recess.

17. The method of claim 13, further comprising threading the tension connector between the handle support, two spaced-apart tension connector engagement features defined on the wheel support, and a tie-down feature such that the wheel support is maintained substantially centered relative to the cooler body at least in part by tensioning of the tension connector.

18. The method of claim 13 wherein the tension connector is a recursive strap threaded between handle support, wheel support and a tie-down featured of the cooler body.

19. The method of claim 13, wherein inserting the handle support includes engaging one or more upwardly extending projections defined on the handle support with a handle recess defined on the exterior of the cooler.

* * * * *